Dec. 26, 1961 R. W. LANDAUER 3,015,090

FERROELECTRIC CIRCUITRY

Filed Aug. 7, 1956 3 Sheets-Sheet 1

INVENTOR.

ROLF W. LANDAUER

BY John E. Dougherty Jr

AGENT

Dec. 26, 1961

R. W. LANDAUER 3,015,090

FERROELECTRIC CIRCUITRY

Filed Aug. 7, 1956

3 Sheets-Sheet 2

United States Patent Office 3,015,090

Patented Dec. 26, 1961

3,015,090
FERROELECTRIC CIRCUITRY

Rolf W. Landauer, Poughkeepsie, N.Y., assignor to International Business Machines Corporation, New York, N.Y., a corporation of New York Filed Aug. 7, 1956, Ser. No. 602,653
11 Claims. (Cl. 340—173.2)

The present invention relates to ferroelectric modulating circuitry and more particularly to circuitry wherein a ferroelectric capacitor is utilized as a switching or gating element.

Switching and gating circuits are basic functional circuits which are employed for a variety of purposes in data handling and accumulating applications. Vacuum tube circuits capable of performing these functions are well established in the art and many such circuits have proved extremely useful in commercially successful data handling and computing systems. However, concurrent with the recent tremendous growth of the computer industry, there has developed a trend to replace vacuum tube circuits, wherever possible, with circuits which utilize, as functional elements, devices which occupy less volume and are capable of reliable and economical operation at extremely high speeds over a long period of time. This trend has led to a large research effort in what have been termed "solid state" elements such as magnetic cores and ferroelectric capacitors. One of the research discoveries concerning the latter type elements has led to the circuits which are the basis of the present invention.

Ferroelectric materials are so named because of the fact that, in certain of their characteristics, they are similar to ferromagnetic materials. This similarity is exemplified in the curves depicting the relationship between internal polarization and applied polarizing field for ferroelectric materials, which exhibit a hysteresis effect comparable to that observed in the typical B–H curve for a ferromagnetic material. Many such ferroelectric materials are known, each being characterized by this hysteresis effect and in that they exhibit a spontaneous polarization in at least two different directions. Among the known ferroelectrics may be numbered Rochelle salt, potassium niobate and barium titanate. The latter material, because it is ferroelectric at room temperature and because it may be switched between opposite states of substantial polarization at extremely high speeds, has been employed as the dielectric in ferroelectric capacitor memory elements. When so used, it is usual the capacitor represent a binary one in one of its unbiased remanent conditions of polarization and a binary zero in the other of its unbiased remanent conditions of polarization. Information is read out of such a capacitor by applying a readout pulse of particular polarity. When the capacitor is in one of its remanent positions, the readout pulse is effective to switch the direction of polarization and the capacitor presents a low impedance to the readout pulse. When the capacitor is in the other remanent condition, the readout pulse merely serves to further polarize the capacitor in the same direction, in which case the capacitor presents a low capacitance and thus a high impedance to the readout pulse. Another capacitor, not of the ferroelectric type, is connected to form with the ferroelectric memory capacitor a voltage divider and the division of voltage between the two elements, when a readout pulse is applied, is indicative of the binary information stored in the capacitor. The operation of circuitry embodying ferroelectric capacitor storage elements is discussed in detail in the Patent No. 2,717,372 issued September 6, 1955 to J. R. Anderson.

A further use, which has been made of ferroelectric materials, is found in their application in dielectric amplifiers. These amplifiers, in their operation, depend upon the fact that the relationship between an applied bias voltage and the dielectric constant, and thus the capacitance, of such a material, is nonlinear. Thus, by applying different bias voltages, these capacitors can be caused to offer different values of capacitance to applied alternating voltages. Examples of the application of dielectric amplifier principles are found in the Patent No. 2,470,893 issued May 24, 1949, to G. Hepp and in the report R–212 of the Digital Computer Laboratory, M.I.T., FIG. 26, pp. 26, 27; June 5, 1952.

It should be noted that in both the above mentioned patent and above mentioned publication it is the varying capacitance of the ferroelectric material which is disclosed as being utilized in obtaining the desired result. Further note should be made of the fact that, though ferroelectric materials having essentially square hysteresis loops are particularly adaptable for use in memory systems, wherein the opposite conditions of remanent polarization are representative of particular information values, in dielectric amplifier applications wherein the nonlinearity of the capacitance characteristic is utilized, it is preferable to employ a material which exhibits little hysteresis.

A further characteristic of ferroelectric materials, and in particular of single crystal barium titanate, is that the small signal conductivity of the material is proportional to the switching current flowing through the material as the polarization therein is being switched from one direction to another. This phenomenon is discussed and graphically illustrated in an article by M. E. Drougard, H. L. Funk, and D. R. Young which appeared in the Journal of Applied Physics, vol. 25, No. 9, September 1954. A principal object of the present invention is to provide novel ferroelectric modulating, switching and gating circuits which, in operation, employ this relationship between small signal conductivity and switching current.

This object and further objects achieved are realized by providing circuitry wherein a capacitor, comprising a pair of electrodes separated by a body of single crystal barium titanate, is connected in series, with a resistive element. A small amplitude signal is applied to the series connected capacitor and resistive element. With the capacitor unbiased and thus in one of the plurality of remanent states it is capable of assuming, the ratio of the impedance of the capacitor to that of the resistive element is such that this signal appears principally across the capacitor. When, however, a signal of sufficient magnitude to switch the polarization of the capacitor is applied, thereby causing a switching current to flow through the capacitor, the small signal conductivity of the capacitor is increased while the switching current is flowing. The small amplitude signal then appears principally across the resistive element. The output is taken across this resistive element and transmitted through a filter to an output terminal. The small signal is chosen to have a frequency which is high, relative to that of the switching signal, and the filter is designed to pass only output signals of this frequency. These high frequency outputs appear at the output terminal only during the time when a switching current flows through the crystal. Since the rate of switching of the polarization domains in the ferroelectric material varies with the magnitude of the applied pulse, the period of time during which an output signal is transmitted may be varied by varying the magnitude of the applied pulses. Further, the amount of switching, and thus the time during which switching occurs, is also dependent upon the initial remanent condition of the capacitor. The capacitor can be caused to initially assume any one of a plurality of different states of remanence by applying either single pulses quantified as to magnitude and duration, or a plurality of successive pulses similarly quantified. The gating circuitry is capable of providing at the output terminal, upon the application of a switching or readout pulse, an output, the duration of which may be indicative of the magnitude and duration of a single previously applied pulse, or may be indicative of the number of individual pulses which have previously been applied to the capacitor. Such circuitry is, of course, capable of performing either digital or analog counting and, since the duration of the output signal is controlled by the switch time, the particular number of cycles of the radio frequency signal output and thus the number of actual pulses produced at the output terminal when a switching pulse is applied, is indicative of the particular remanent condition of the capacitor.

A further embodiment of the invention discloses an analog divider the operation of which is dependent upon the fact that, when a small amplitude, high frequency signal and a switching pulse are coincidently applied to a barium titanate capacitor, the high frequency voltage developed across the capacitor is proportional to the ratio of the high frequency current to the switching current.

Thus, a further object of the invention is to provide a high frequency gating circuit which utilizes a ferroelectric capacitor as a switching element.

Another object is to provide such circuitry in which the ferroelectric capacitor may be caused to assume any one of a plurality of different remanent conditions in response to the application of either one or a series of information pulses and wherein the output, developed upon the subsequent application of a switching or gating pulse, is indicative of the particular one of these remanent conditions the capacitor is in.

A further object is to provide a ferroelectric analog divider.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 3 is a pulse timing diagram for the circuit of FIG. 2.

Figure 1:
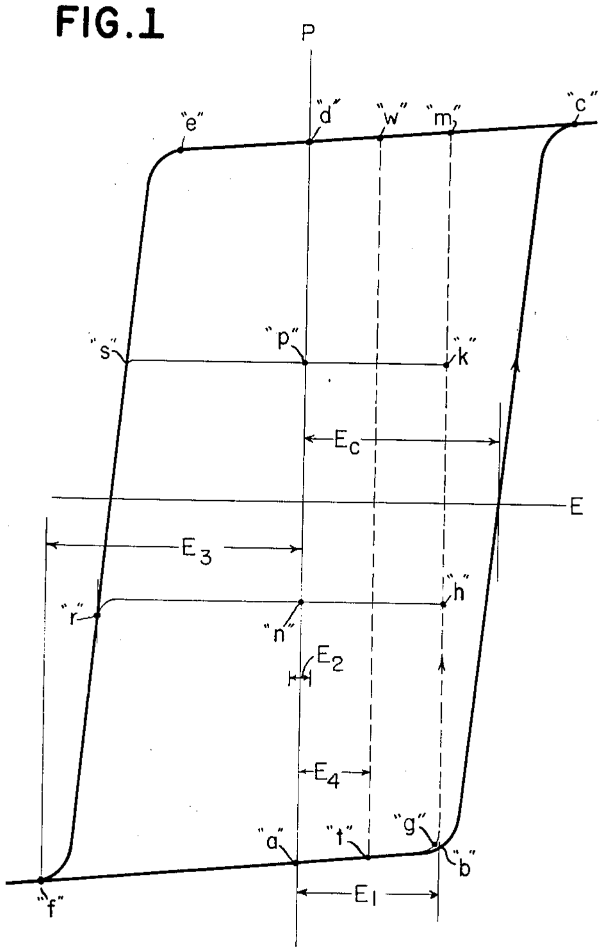
FIG. 1 is a diagrammatic illustration of a hysteresis loop such as is exhibited by a particular barium titanate capacitor and also depicts the polarization-applied voltage relationship for the capacitor for certain applied voltage signals.
Figure 2:
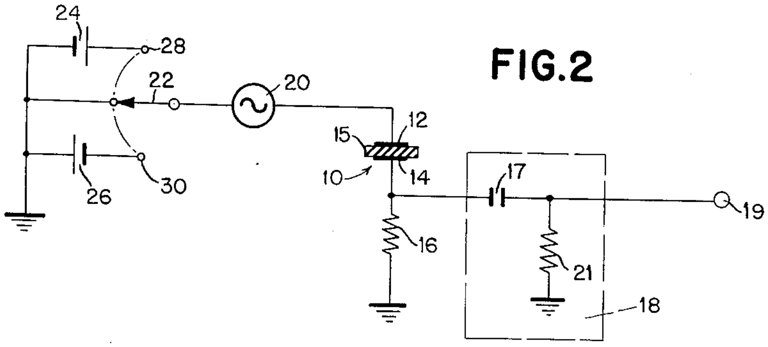
FIG. 2 is a diagrammatic representation of a first circuit embodying the invention.

There is shown in FIG. 1 a plot of internal polarization (P) versus applied voltage (E) for a ferroelectric capacitor such as is shown at 10 in FIG. 2. The capacitor comprises a pair of electrodes 12 and 14 separated by a body of single crystal barium titanate 15 which serves as a dielectric. The hysteresis loop, typical of that obtained when the capacitor is subjected to an alternating voltage of sufficient magnitude, may be traced from the letter "*a*" through "*b*" to "c," as the voltage is increased in one direction, and then from "*c*" through "*d*" and "*e*" to "*f*," as the voltage is increased in the opposite direction. The flat portions of the loop "*edc*" and "*fab*" represent conditions of substantial saturation and the remanent states at "*a*" and "*d*" are the extreme or limiting remanent states which the capacitor is capable of assuming. This hysteresis loop is of course useful in explaining the relationships between applied voltage and polarization in ferroelectric capacitors. It is usual to state that a voltage, greater than a coercive voltage shown as $E_c$ in FIG. 1, is effective to reverse the direction of polarization in the capacitor. For example, if the capacitor is in the remanent state at "*a*," the application of a voltage, in magnitude greater than $E_c$, is effective to reverse the direction of polarization in the capacitor. Such a voltage, if maintained for a sufficient time to cause the loop to be traversed from "*a*" through "*b*" to "*c*," causes the material to assume the opposite remanent condition since, upon termination of such a pulse, the loop is traversed from "*c*" to "*d*." Similarly the application of a voltage pulse of sufficient magnitude and of opposite polarity is effective, when the capacitor is initially at remanence at "*d*" to reverse the polarization and cause the capacitor, upon termination of the pulse, to assume the remanent state of polarization at "*a*."

Emphasis should be here made of the fact that the switching of polarization is dependent upon the duration of the applied pulse as well as upon its magnitude. It is for this reason that a hysteresis loop, such as that shown, must be considered as exactly representative of the relationship between polarization and applied voltage only for a voltage signal having a particular amplitude and wave form. For example, the hysteresis loop would itself indicate that the application of a voltage, in magnitude less than $E_c$, would be ineffective to reverse the polarization in the material. However, such is not the case and if, for example, with the capacitor initially in the remanent state "*a*," a pulse, in magnitude $E_1$ volts, which, as shown, is less than the coercive voltage is applied, the polarization will be completely reversed if the pulse is maintained for a sufficient period of time. When the pulse is initially applied, the loop is traversed from "*a*" to "*g*" and, as the pulse is maintained, the portion "ghkm" represents the change in polarization as the material is switched. Upon termination of the pulse the capacitor assumes the remanent state at "*d*." Where the pulse is terminated before the material is completely switched, the capacitor assumes a remanent state intermediate the limiting remanent states at "*a*" and "*d*." Such states are indicated at "*n*" and "*p*" in FIG. 1.

The conductivity, which a ferroelectric capacitor offers to small signals during switching operations such as above described, is proportional to the switching current flowing through the crystal. If a radio frequency signal is applied to a ferroelectric capacitor in one of its remanent conditions, the amplitude of the signal being relatively small such as is indicated at $E_2$ in FIG. 1 and thus incapab'e of switching polarization domains in the material, the conductivity offered by the capacitor is extremely low. However, when a voltage pulse of sufficient magnitude to reverse polarization in the barium titanate is applied and a switching current is thus caused to flow through the material, the small signal conductivity of the material increases with the flow of switching current.

Referring now to FIG. 2 there is shown a gating circuit constructed in accordance with the principles of the invention. The circuit includes a ferroelectric capacitor 10 which is connected in series with a resistive element 16. The output of the circuit is taken by way of a filter 18, which is connected to a junction between resistive element 16 and capacitor 10. A radio frequency signal source 20 is connected to the electrode 12 of capacitor 10. The amp'itude of the radio frequency signal applied by the source 20 is appreciably less than the coercive voltage for capacitor 10. Let us assume that the capacitor 10 is in the remanent condition at "*a*" in FIG. 1 and a switching device, designated 22 in FIG. 2, is in the position shown so that the only signal being applied to capacitor 10 is that supplied by source 20. Since the amplitude of the high frequency signal applied by source 20 is small, in the order of $E_2$ volts as shown in FIG. 1, the signal will be ineffective to cause any switching of polarization in capacitor 10. As a resu't the conductivity of the capacitor is very low and the division of the voltage drop across the series connected resistor 16 and capacitor 10 is such that very little of the total voltage drop occurs across resistor 16 and no appreciable output is transmitted through filter 18 to be manifested at an output terminal 19. The filter 18 is chosen to pass only signals in the frequency range supplied by source 20 and is effective to prevent gating pulses, of lower frequency and greater magnitude, which are applied in a manner about to be explained, from causing outputs to appear at the output terminal. Filtering circuitry capable of performing this function is shown within box 18 to comprise a capacitor 17 and a resistor 21 connected to a reference potential, here shown as ground. The switching device 22, in the position shown connects the signal source 20 directly to ground but may be transferred to connect either one of a pair of signal sources, shown as batteries 24 and 26, to apply signals to the capacitor 10. Though switch 22 is shown as a manual switch in order to more clearly and concisely describe the principles of the invention, it should be understood that high speed electronic switching and pulse devices capable of applying pulses such as those about to be described can, of course, be substituted for the simple structure here shown.

Figure 3:
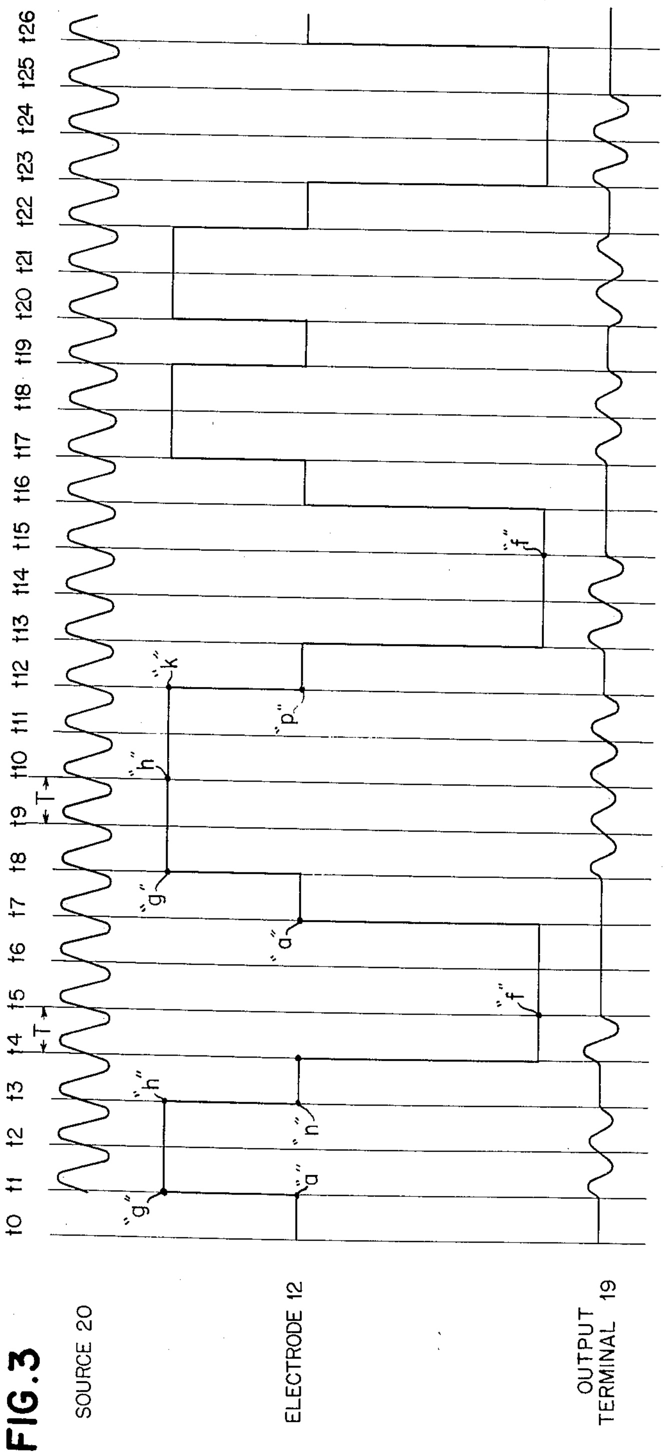
FIG. 3 is a pulse timing diagram for the circuit of FIG. 2.

When switch 22 is transferred to contact a terminal 28 and thereby connect battery 24 in the circuit, the operation may be best understood by a concurrent consideration of FIGS. 2 and 3. The battery 24 is chosen to be effective, when switch 24 is thus transferred, to raise the potential at electrode 12 sufficiently to cause capacitor 10 to be subjected to a voltage drop, in magnitude equal to the magnitude $E_1$ volts shown in FIG. 1. If we consider that switch 22 is transferred to thus raise the potential at electrode 12 at a time $t_1$, the hysteresis loop of FIG. 1 is traversed from "*a*" to "*g*" as the voltage is initially applied, as is indicated by the corresponding letters on the pulse form of FIG. 3. For the purposes of illustration the pulses supplied by batteries 24 and 26 are shown as idealized square pulses in FIG. 3. The switch 22 is maintained in the transferred condition during the time interval extending from $t_1$ to $t_3$, during the time interval some switching of polarization domains in the barium titanate is effected as is indicated by the segment "*gh*" in FIG. 1. Upon termination of the pulse supplied by battery 24, when switch 22 is restored to its initial position, the capacitor 10 assumes a remanent state of polarization at "*n*." During the time in which the polarization of capacitor 10 is being switched, that is as the segment "*gh*" of FIG. 1 is being traversed, a switching current flows through the capacitor. The small signal conductivity of capacitor 10, as above mentioned varies with the switching current flowing through the crystal and thus, during the interval of switching extending from $t_1$ to $t_3$, the capacitor 10 presents a relatively high conductivity to the high frequency signal supplied by source 20. During this time the high frequency signal appears principally across resistor 16 causing an output signal to be transmitted through the low frequency filter 18 and, as is indicated in FIG. 3, to be manifested at output terminal 19. Filter 18 prevents any output resulting directly from the application of the low frequency pulse applied by battery 24 from being manifested between output terminal 19.

During the time interval $t_3$ to $t_4$, switch 22 is maintained in the position shown and capacitor 10 remains essentially in the remanent condition at "*n*," in which condition the conductivity of the capacitor is relatively low. During this time interval the small signal applied by source 20 appears principally across the capacitor and no appreciable output is manifested at terminal 19.

At time $t_4$ switch 22 is transferred to contact a terminal 30 and thereby connect battery 26 in the circuit. The battery 26 is chosen to be effective to lower the potential at electrode sufficiently to cause the capacitor 10 to be subjected to a voltage drop, in magnitude in the order of the magnitude shown at $E_3$ in FIG. 1. The voltage $E_3$ is maintained for three of the time intervals T and is effective, when maintained for such a period of time, to completely reverse the polarization in the barium titanate capacitor 10. For example, if the capacitor 10 were, when initially in the remanent condition at "*d*," subjected to a voltage $E_3$ volts, the loop would be traversed from "*d*" through "*e*" to "*f*." This complete switching of polarization for an applied voltage of $E_3$ volts would occur in three of the time intervals T. When the capacitor is initially in the intermediate remanent condition at "*n*" of FIG. 1, the applied voltage of $E_3$ volts is effective to cause the loop to be traversed from "*n*" through "*r*" to "*f*" during one of the time intervals shown. Since the small signal conductivity of the capacitor 10 is raised only when a switching current is flowing, that is, only during the time the portion "*rf*" of FIG. 1 is being traversed, an output is transmitted through filter 18 and manifested at terminal 19 during the time interval $t_4$—$t_5$. Since, at $t_5$ time, the capacitor is essentially in a saturated condition of polarization, the continued application of the voltage is ineffective to cause any appreciable switching current to flow through capacitor 10. During the latter two time intervals of the application of the pulse by battery 26, the high frequency signal applied by source 20 appears principally across capacitor 10 and no appreciable output is manifested at terminal 19. Upon termination of the pulse supplied by battery 26, when switch 22 is restored at $t_7$ time, the capacitor assumes the remanent condition of polarization of "*a*."

At time $t_8$, switch 22 is again transferred to contact terminal 28 to render battery 24 again effective to subject capacitor 24 to a voltage drop of $E_1$ volts. The switch is maintained in the transferred condition until $t_{12}$ time to allow capacitor 10 to be subjected to the voltage for four of the time intervals T. The segment "*ghk*" of FIG. 1 is traversed during this time and, since the applied voltage is, for this period of time, insufficient to completely switch the polarization in the crystal, a switching current flows through crystal 10 from time $t_8$ to $t_{12}$ and an output signal is manifested at terminal 19 during this period of time. Upon termination of this applied pulse, when switch 22 is restored at time $t_{12}$, the capacitor 10 assumed the intermediate remanent condition at "*p*" of FIG. 1. Thus, when at time $t_{13}$ switch 22 is transferred to again render battery 26 effective to subject capacitor 10 to a voltage drop of $E_3$ volts, the segment "*psrf*" of FIG. 1 is traversed. The magnitude of voltage $E_3$ is such, that it is effective to cause this segment to be traversed during the first two time intervals of the application under consideration, and, since the capacitor thus arrives at a condition of substantial saturation at time $t_{15}$, it is during the two time intervals from $t_{13}$ to $t_{15}$ that a switching current flows and a high frequency output is manifested at terminal 19.

From the above it can be seen that the duration of the outputs produced in the circuit of FIG. 3, is dependent upon both the magnitude and duration of the applied gating pulses as well as the sequence of gating pulses. The latter dependency is due to the fact that the duration of the output, upon the application of a gating pulse, varies in accordance with the initial condition of the capacitor. This is illustrated in the outputs produced when a pulse is supplied by battery 26. When supplied during the time interval extending from $t_4$ to $t_7$, with the capacitor initially at remanence in the remanent condition "*n*," an output is manifested at terminal 10 only during the first time interval following the application of the pulse; but when supplied during the time intervals extending from $t_{13}$ to $t_{16}$, with capacitor originally in the remanent condition "*p*," an output is manifested at terminal 19 during the first two time intervals following the application of the pulse. It is thus evident that the duration of the output, for a given applied pulse, is indicative of the initial condition of the capacitor and thus may be indicative of the past history of the capacitor, that is indicative of either the magnitude, duration, sequence or number of pulses previously applied.

This latter mentioned property, that is, the property of indicating, upon the application of an input pulse, the number of pulses previously applied is illustrated in the operation of the circuitry for the pulses shown in FIG. 3, to be applied beginning at time $t_{17}$. At this time switch 22 is transferred to allow battery 24 to apply a pulse to electrode 12. The switch is restored at time $t_{19}$ so that the pulse duration is for two time intervals and such a pulse is effective, as was explained with reference to the pulse supplied by this battery at time $t_1$, to cause the capacitor 10 to assume the remanent state at "*n*." At time $t_{20}$ a similar pulse is applied which is effective to cause the segment "*nhk*" of FIG. 1 to be traversed and, upon termination of the pulse, the capacitor assumes a remanent state at "*p*." With the capacitor in this condition, the application by battery 26 of the pulse shown extending from time $t_{23}$ to $t_{26}$ is effective, as before, to cause an output to be manifested at output terminal 19 during the first two time intervals after the pulse is initially applied. It is, of course, obvious that, were only one pulse applied by the battery 24, the output signal developed at terminal 19 would be maintained only from time $t_{23}$ to $t_{24}$ and further, that, if a third pulse were applied by battery 24 before battery 26 were connected in the circuit to apply a negative pulse, the output developed at terminal 19 would be maintained for three time intervals. In this manner the circuit of FIG. 1 is effective, when interrogated by a readout pulse to indicate the number of pulses, quantified as to magnitude and duration previously applied. Since the signal source 20 may be chosen to provide a signal having a frequency such that it provides a predetermined number of pulses during a given unit time interval, and, since the time interval during which an output is maintained is dependent upon the state of the capacitor 10, the number of output pulses manifested between terminals is also indicative of either the magnitude and duration or the number of quantified pulses previously applied by battery 24. The time interval, during which an output is manifested at terminal 19, in response to the application of a pulse by battery 26 to the capacitor when the capacitor is in any particular condition of remanent polarization, may be varied by varying the magnitude of the pulse applied by this battery. For example, if the pulse applied by battery 26 were to have a magnitude greater than that shown, switching would be effected at greater speeds and both the duration of the output signal and the number of output pulses transmitted to appear at terminal 19 would be decreased.

Note should here be made of the fact that the admittance which a ferroelectric capacitor offers to a small signal during switching includes a capacitive as well as a conductive component. At very high frequencies the value of the capacitive component is large relative to the conductive component. At relatively low frequencies the capacitive component is comparable in magnitude to the conductive component. However, at intermediate frequencies primarily in the radio frequency range, the admittance is primarily conductive and it is in this frequency range that the proportionality between switching current and small signal conductivity is most marked. Thus, in the circuitry above described and in that about to be described it is preferable, where it is desired that the output signal be in phase with the input signal, the small signals applied to barium titanate capacitors, such as are presently available, have a frequency within a range from 100 kilocycles per second to 10 megacycles per second. In this connection it should be noted that the pulse shapes of FIG. 3 are not to scale and that the frequency of the signal applied by source 20 is much higher relative to the frequency of the signals applied under control of switch 22 than shown.

Figure 4:
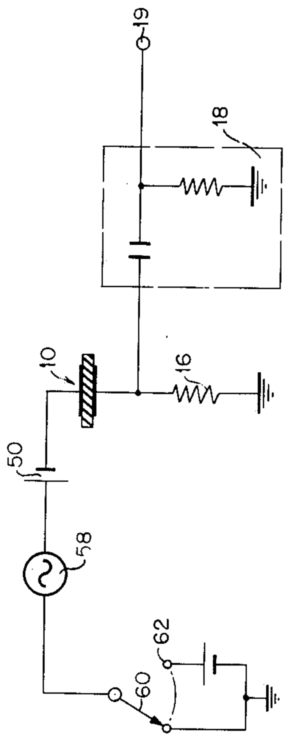
FIGS. 4, 5 and 6 are diagrammatic representations of further embodiments of the invention.

FIG. 4 shows an embodiment of a gating circuit, wherein a ferroelectric capacitor 10 is normally maintained in a biased condition by a battery 50 so that unipolar gating pulses may be applied successively to produce gated outputs at output terminal 19. The circuit is similar to that of FIG. 2, in that capacitor 10 is connected in series with resistive element 16 and the output is taken across this resistive element and transmitted through low frequency filter 18. The high frequency signal is here applied by a signal source 58. With a switch 60 in the condition shown, the battery 50 is effective to maintain the capacitor biased to the condition designated "*f*" in FIG. 1. When switch 60 is transferred and then restored, a battery 64 applies a gating pulse of sufficient magnitude to cause a switching current to flow through capacitor 10. The small signal conductivity of the capacitor is then increased causing the signal applied by signal source 58 to appear principally across resistor 16. The duration of the gated signal passed through filter 18 to output terminal 19 is dependent upon the duration and magnitude of the pulse applied by battery 62. For example, if battery 62 is effective when switch 60 is operated to cause capacitor 10 to be subjected to a voltage drop in the order of the magnitude $E_4$ volts shown in FIG. 1, an output is manifested as the segment "*tw*" of that figure is traversed. The output is, of course, terminated if the gating pulse supplied by battery 62 is terminated before switching is completed. If the gating pulse applied by battery 62 is maintained for a time longer than is necessary to complete switching, then the output signal is governed only by the time required to completely switch the barium titanate and is terminated after the segment "*tw*" has been traversed. Upon termination of the gating pulse, the bias battery 50 is effective to again reverse the polarization and cause the capacitor to assume its initial condition "*f*" in readiness for another gating pulse. A signal is manifested at terminal 19 during this switching back to the initial state, but either the duration or the magnitude of this output may be controlled or if desired may be minimized by properly choosing the characteristics of the bias battery 50. For example, this battery may be chosen to be effective to apply an extremely high voltage to capacitor 10, in which case the switching back to the original condition is accomplished in an extremely short time and the resulting signal manifested at terminal 19 is of brief duration. Since the small signal conductivity of capacitor 10 is proportional to the switching current, the magnitude of the voltage supplied by bias battery 50 may be chosen such as to be effective to apply only a small voltage to capacitor 10 and thereby cause the small signal conductivity of the capacitor to be increased only slightly. In such a case, only a relatively small output signal is developed across resistor 16 and transmitted to terminal 19 when the capacitor is being switched back to its original biased condition. Since the time required to completely switch the material increases as the magnitude of the switching pulse is decreased, the duration of this signal is of course, greater than where battery 50 is effective to apply a large voltage to the capacitor 10.

Figure 5:
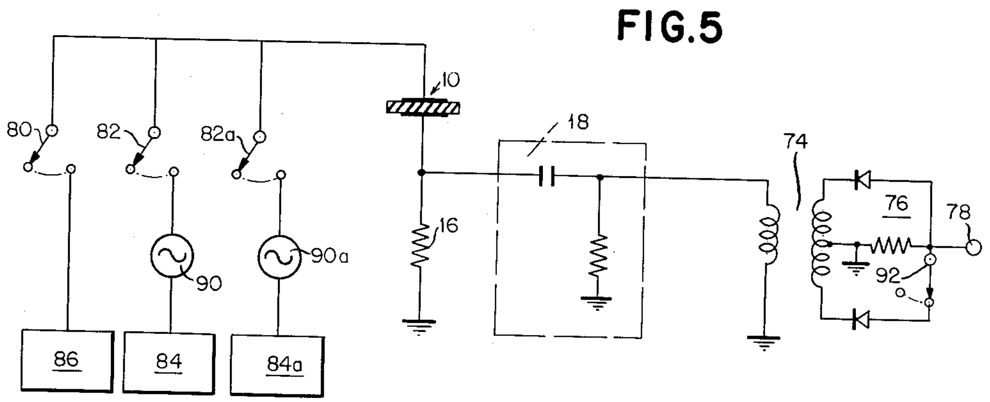

FIG. 5 shows a counter constructed in accordance with the principles of the invention. The ferroelectric capacitor 10 is, as before, connected to form a voltage divider with resistive element 16. Filter 18 which passes only high frequency signals is connected across the resistive element 16 and the output of the filter is applied through a transformer 74, to a full wave rectifier 76 which is coupled to an output terminal 78.

Input, and read and restore pulses are applied to the circuit under control of a pair of switches 80 and 82, respectively. When switch 82 is transferred a signal source 84 is effective to apply to the capacitor 10 an electric field of proper polarity and sufficient magnitude and duration to be effective, regardless of the initial condition of the capacitor, to cause the capacitor to assume the saturated condition at "*f*" in FIG. 1. Upon termination of this field the capacitor assumes the remanent state at "a." Input pulses are applied to the counting circuit by a pulse source 86 under control of switch 80. Each time switch 80 is operated, pulse source 86 is effective to apply to capacitor 10 an electric field of a polarity opposite to that applied by source 84. The pulses supplied by source 86 are so quantified as to magnitude and duration that ten such pulses are required to completely switch the direction of polarization in capacitor 10. Each pulse is effective to cause the capacitor to assume a different remanent state intermediate the limiting remanent states "a" and "d," the tenth in a series of such pulses being effective to cause the capacitor to assume the remanent state at "d."

The remanent state, which is assumed after each of a series of such pulses is applied, is indicative of the total number of pulses applied. When switch 82 is operated to apply a readout pulse effective to again switch the capacitor back to the remanent state "f," a signal source 90 is also effective to apply a high frequency, small amplitude signal to the capacitor. The period of time during which this signal appears across resistor 70 with sufficient magnitude to cause a distinguishable output to be manifested at output terminal 78 is dependent upon the initial condition of the capacitor and thus the number of pulses applied by pulse source 86. The output at terminal 76 is in the form of a plurality of successive unipolar pulses recurring at the frequency of the signal applied by source 90. Since the duration of the output signal is determined by the number of pulses originally applied by source 86, the number of pulses manifested at terminal 78 is also dependent upon the number of pulses originally applied by source 86. The number of pulses produced at terminal 78 upon the application of a readout pulse is thus indicative of the digital information applied to the capacitor. The number of pulses produced for any given digit stored in capacitor 10 may be varied by varying the magnitude of the read and restore pulse supplied by source 84. The output pulses may be separated, and their number decreased by one half, by applying the pulses developed on the secondary of transformer 74 to a half wave rectifier instead of the full wave rectifier shown. This may be accomplished merely by opening a switch 92 in the rectifier circuit.

It is evident, from the description given with respect to FIGS. 2 and 3, that the inputs applied by source 86 may be in the form of pulses having a constant magnitude and variable duration or a constant duration and a variable magnitude and that, in either case, both the duration of the output signal and number of the output pulses manifested at terminal 78, when switch 82 is operated to interrogate the capacitor, are indicative of either the duration or the magnitude of the pulse applied by source 86 according to which is varied. Further note should be made of the fact that the output might in any of the above cases be taken in complimentary form by closing a switch 82a to connect a high frequency signal source 90a and a low frequency signal source 84a in the circuit. Signal source 84a, when switch 82a is operated, applies a pulse of a polarity opposite to that applied by source 84, which pulse is effective, regardless of the initial state of the capacitor to cause it to assume the remanent condition at "d" in FIG. 1. When this is done it is, of course, necessary to then operate switch 82 to restore the capacitor to the remanent condition "a" of FIG. 1 before further inputs are applied.

Figure 6:
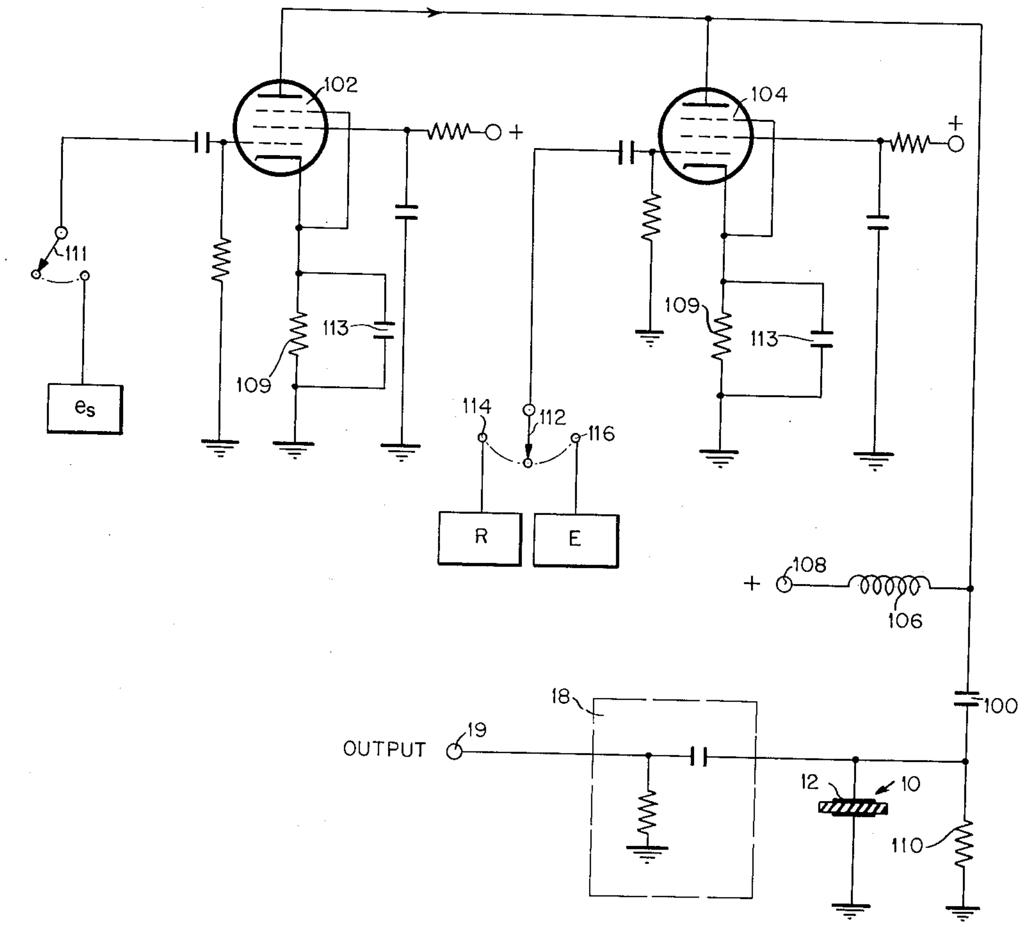

FIG. 6 shows an analog divider circuit constructed in accordance with the principles of the invention. As has been previously stated the small signal conductivity of a ferroelectric capacitor is, during the time it is being switched, proportional to the switching current flowing through the capacitor. Where a small signal current is applied to such a capacitor, while it is being switched, the voltage drop across the capacitor due to the small signal is, of course, directly proportional to the magnitude of the small signal current and, since the small signal conductivity of the capacitor is directly proportional to the switching current, the small signal voltage drop is inversely proportional to the switching current. If we consider the magnitude of the voltage developed across the capacitor to the "e," the magnitude of the small signal current to be "i" and the magnitude of the switching current to be I, then this relationship may be set out as follows:

$$\text{“}e\text{”} \approx \frac{\text{“}i\text{”}}{I}$$

This relationship satisfied the requirements for an analog divider circuit in which it is required that the output, produced in response to the application of two independent inputs, be proportional to the ratio of the inputs. In the circuit of FIG. 6, a ferroelectric capacitor 10 is shown to be connected through a capacitor 100 to the parallel connected plates of two pentodes 102 and 104. The plates of both pentodes are connected through a choke in the form of an inductor 106 to a suitable positive potential terminal 108. Cathode resistors 109 having low ohmic values and by-passed by capacitors 113 are connected in the grid circuits of each pentode so that both are normally conducting and operative along a linear portion of their characteristic. A resistance element 110 is connected across ferroelectric capacitor 10. This resistor has an impedance value which is large compared to the switching impedance of crystal 10, but small relative to the leakage resistance of capacitor 100. Capacitance 100 is chosen to have a sufficiently high capacitance to ensure that the D.C. voltage drop, existing with the pentodes conducting in the normal manner, appears principally across this capacitor and the ferroelectric capacitor 10 remains essentially in an unbiased condition in one of its remanent states.

In order to cause the capacitor 10 to assume a particular remanent state anticipatory of the application of input signals to the circuit, a switch 112 in the grid circuit of pentode 104 is transferred to contact a terminal 114 and thereby allow a voltage source, shown in box form and designated R, to apply a pulse to the grid of pentode 104. The signal source R is then effective to apply a positive pulse to the grid of pentode 104, thereby increasing the current flow through the tube and causing a negative pulse to be applied to the electrode 12 of capacitor 10. The magnitude and duration of the pulse applied by source R is sufficient to ensure that, upon termination of the pulse, the ferroelectric capacitor assumes the remanent state at "a" in FIG. 1. With capacitor 10 in this condition the circuit is ready for the application of input pulses which are applied by transferring a switch 111 to allow a pulse source designated "$e_s$" to apply a pulse to the control grid of pentode 102 and, at the same time or subsequently, transferring switch 112 to allow a voltage source designated E to apply a pulse to the control grid of pentode 104. When switch 111 is thus transferred, signal source "$e_s$" applies to the control grid of pentode 102, an alternating signal which, since pentode 102 normally conducting in the linear portion of its characteristic, causes an alternating signal of relatively small amplitude to be applied to the electrode 12 of ferroelectric capacitor 10. Voltage source E is effective, when switch 112 is operated to contact terminal 116, to apply a negative pulse to the control grid of pentode 104 thereby decreasing the current flowing through the tube and causing a positive pulse to be applied to the electrode of 12 of capacitor 10. The magnitude and duration of the pulse applied to the capacitor is sufficient to cause it to be switched from its original remanent condition at "a" of FIG. 1 to the opposite remanent condition at "d." The pentodes 102 and 104 are chosen to have a high plate resistance relative to the switching resistance of the capacitor 10. As a result, the current flow through capacitor 10 due to the signals applied by each of these pentodes remains essentially constant as the capacitor is switched and, since, as has been previously noted, the pentodes are operated in the linear portions of their characteristics, the magnitude of the switching and small signal currents are proportional to the amplitude of the signals applied by signal sources E and "$e_s$," respectively. The magnitude of the voltage drop across capacitor 10, at the frequency of the signal applied by pentode 102, during switching is, as before stated, proportional to the ratio of the small signal current to the switching current and thus proportional to the ratio of the amplitude of the voltage signal supplied by signal source "$e_s$" to that supplied by signal source E. The output is taken by way of low frequency filter 18 which passes only signals of the frequency applied by signal source "$e_s$." Thus only this high frequency signal, which is proportional to "$e_s/E$," is manifested at output terminal 19.

Consider now that the signal sources "$e_s$" and E are controllable to apply signals of different magnitude to the control grids of the pentodes during a succeeding time interval after switch 112 has been operated to allow signal source R to apply a restoring pulse to capacitor 10. In such a case, when during said succeeding time interval switches 111 and 112 are operated to allow signal sources "$e_s$" and E to apply signals to the control grids of the pentodes, the output voltage at terminal 19 is again proportional to the ratio of the amplitude of signal applied by source "$e_s$" to the amplitude of the signal applied by source E. The circuit may be operated with the signal applied by either signal source "$e_s$" or E of constant amplitude and the signals applied by the other signal source being of varying amplitude. For example, if we consider that the signals applied by source E are of constant amplitude and that source "$e_s$" is controllable to apply pulses of different amplitudes, then the outputs developed at terminal 19 are directly proportional to the amplitude of the signals applied by signal source "$e_s$."

Further, it should be noted that the duration of the pulses supplied by source E may be so controlled that the capacitor is only partially switched during each operation. In such a case it is not necessary to apply a restore pulse after each analog operation but according to the duration of the switching pulse after each of a predetermined number of operations.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit comprising a ferroelectric capacitor capable of assuming at least one stable state of remanent polarization in each of first and second directions, first means coupled to said capacitor operable to apply thereto a first pulse effective to cause said capacitor to be polarized in said first direction, second means applying to said capacitor a second pulse effective to at least partially switch the direction of polarization in said capacitor, further means applying to said capacitor coincident with said second pulse a signal having an amplitude apreciably less than that of said second pulse, and output means coupled to said capacitor for manifesting a distinguishable output in response to said signal only when the polarization in said capacitor is being switched.

2. A circuit comprising a capacitor, a polarization applied field characteristic of said capacitor being in the form of a hysteresis loop, the slope of the saturation portions of said loop being small in comparison with the slope of the switching portions of said loop, means for causing said capacitor to assume a state of polarization on one of the saturation portions of said loop, means applying to said capacitor a first signal of insufficient magnitude to cause other than a part of said one saturation portion of said loop to be traversed, means applying to said capacitor a second signal of itself of sufficient magnitude to cause at least a part of one of the switching portions of said loop to be traversed, and means coupled to said capacitor for producing an output in response to said first signal only when said switching portion of said loop is being traversed in response to the application of said second signal.

3. A circuit comprising a ferroelectric capacitor capable of assuming a plurality of stable states of remanent polarization, first means initially controlled to apply to said capacitor a pulse effective to cause said capacitor to assume one of said stable states, second means subsequently applying to said capacitor a pulse effective to at least partially switch the polarization in said capacitor, said first means being controlled after said polarization is switched to apply a pulse effective to cause said capacitor to be switched back to said one stable state, third means coupled to said capacitor for applying thereto an alternating signal coincident with said second pulse applied by said first means, and output means connected to said capacitor for manifesting an alternating output in response to said signal when said capacitor is being switched back to said one stable state.

4. A circuit comprising a capacitor having a dielectric of ferroelectric material, said material exhibiting a hysteresis loop with a high ratio between the slopes of the switching portions of the loop to the slopes of the saturation portions of the loop, means coupled to said capacitor applying thereto a biasing electric field of sufficient magnitude and proper polarity to polarize said capacitor in a stable state on one of the saturation portions of said loop, means coupled to said capacitor for applying thereto a first signal of insufficient magnitude in the presence of said biasing field to cause other than a portion of said one saturation portion of said loop to be traversed, means coupled to said capacitor for applying thereto a signal sufficient of itself to be effective in the presence of said biasing field to cause at least a part of one of the switching portions of said loop to be traversed, and means coupled to said capacitor for providing an output in response to said first signal when said switching portion of said loop is traversed.

5. A circuit comprising a ferroelectric capacitor, first signal means for applying to said capacitor signals of a predetermined amplitude and polarity, switching means intermediate said capacitor and first signal means for controlling said signal means to apply to said capacitor a signal of one duration during one time interval and a signal of different duration during a succeeding time interval, second signal means controllable to apply to said capacitor during another time interval a signal of a polarity opposite to the polarity of signals applied by said first signal means, third signal means for applying to said capacitor an oscillating signal having an amplitude smaller than said predetermined amplitude and ineffective of itself to produce switching in said capacitor, and output means coupled to said capacitor for manifesting an alternating output during a time interval when a signal is applied by one of said first and second means coincidently with a signal applied by said third signal means.

6. A circuit comprising a ferroelectric capacitor capable of assuming first and second limiting stable states of remanent polarization and capable of assuming a plurality of different stable states intermeditae said first and second states, first means coupled to said capacitor controllable to initially apply thereto a first signal having a polarity, amplitude and duration such that it is effective to cause said capacitor to assume said first state, second means coupled to said capacitor for applying during a first time interval information pulses to said capacitor, the polarity, magnitude and duration of said information pulses being such that the application of a predetermined number of said pulses is effective to cause said capacitor to assume said second limiting state and the application of different numbers of information pulses less than said predetermined number is effective to cause said capacitor to assume different ones of said other stable states, said first means being controllable after said first time interval to apply to said capacitor a second signal having a polarity, magnitude and duration such that it is effective to switch said capacitor back to said first stable state, third means coupled to said capacitor for applying thereto coincidently with said second signal an alternating signal having an amplitude which is small in comparison to that of said second signal, and output means coupled to said capacitor for manifesting an alternating output in response to said alternating signal while said capacitor is being switched back to said first state by said second signal.

7. A circuit comprising a ferroelectric capacitor capable of assuming first and second limiting stable states of remanent polarization and capable of assuming a plurality of different stable states intermediate said first and second states, first means coupled to said capacitor controllable to initially apply thereto a first signal having a polarity, amplitude and duration such that it is effective to cause said capacitor to assume said first state, second means coupled to said capacitor for applying during a first time interval information pulses to said capacitor, the polarity, magnitude and duration of said information pulses being such that the application of a predetermined number of said pulses is effective to cause said capacitor to assume said second limiting state and the application of different numbers of information pulses less than said predetermined number is effective to cause said capacitor to assume different ones of said other stable states, third means coupled to said capacitor and controllable after said first time interval to apply to said capacitor a signal having a polarity, amplitude and duration such as to be of itself effective to cause said capacitor to assume said second stable state, fourth means for applying to said capacitor coincidently with the signal applied by said third means a signal having an amplitude which is small in comparison to the amplitude of the signal applied by said third means, and means coupled to said capacitor for manifesting an output indicative of the state of said capacitor in response to the application of coincident signals by said third and fourth means.

8. A circuit comprising a ferroelectric capacitor, a polarization applied field characteristic of said capacitor being in the form of a hysteresis loop, the slope of the saturation portions of said loop being small in comparison with the slope of the switching portions of said loop, means coupled to said capacitor for causing it to assume a state of polarization on one of the saturation portions of said loop, means coupled to said capacitor causing an alternating signal to be applied thereto, said alternating signal being effective to cause traversals only along said one saturation portion of said loop, means coupled to said capacitor for causing a discrete pulse to be applied thereto at a time when said alternating signal is applied, said pulse being of sufficient magnitude and proper polarity to be effective of itself to cause at least one of the switching portions to be traversed, and output means coupled to said capacitor for manifesting an output in response to said alternating signal when said switching portion of said loop is traversed.

9. A circuit comprising a ferroelectric capacitor, a polarization applied field characteristic of said capacitor being in the form of a hysteresis loop, the slope of the saturation portions of said loop being small in comparison with the slope of the switching portions of said loop, means for causing said capacitor to assume a first state of polarization on one of the saturation portions of said loop, means for causing an alternating signal to be applied to said capacitor when it is in said first state of polarization, the amplitude of said alternating signal being such that it is ineffective to cause other than a part of said one saturation portion of said loop to be traversed, means for causing a discrete pulse of an amplitude appreciably greater than that of said alternating signal to be applied to said capacitor at a time when said alternating signal is applied to cause a part of at least one of the switching portions of said loop to be traversed thereby producing a switching current in said capacitor, and output means coupled to said capacitor for manifesting a distinguishable output in response to said alternating signal when said discrete signal is being applied.

10. A circuit comprising a ferroelectric capacitor, a polarization applied field characteristic of said capacitor being in the form of a hysteresis loop, the slope of the saturation portions of said loop being small in comparison with the slope of the switching portions of said loop, means for causing said capacitor to assume a first state of polarization on one of the saturation portions of said loop, the small signal conductively of said capacitor being appreciably greater when the switching portions of said loop are being traversed than when the saturation portions of said loop are being traversed, means for causing an alternating signal to be applied to said capacitor the amplitude of which is such that it is ineffective of itself to produce a switching current in said capacitor, means for causing a discrete signal to be applied to said capacitor, said discrete signal being of itself of sufficient amplitude to produce a switching current therein thereby allowing said capacitor to present a relatively high conductivity to said alternating signal, and means coupled to said capacitor for producing a distinguishable output when said alternating and discrete signals are coincidently applied to said capacitor.

11. A circuit comprising a ferroelectric capacitor, a polarization applied field characteristic of said capacitor being in the form of a hysteresis loop, the slope of the saturation portions of said loop being small in comparison with the slope of the switching portions of said loop, means for causing said capacitor to assume a first state of polarization on one of the saturation portions of said loop, the small signal conductivity of said capacitor being essentially proportional to the switching current therein, means for polarizing said capacitor to a point on said hysteresis loop, means for causing to be applied to said capacitor an alternating signal of itself insufficient to produce a switching current in said capacitor, and means for causing to be applied to said capacitor at a time when said alternating signal is applied a switching signal effective of itself to produce a switching current in said capacitor thereby allowing said capacitor to present a relatively high conductivity to said switching signal.

References Cited in the file of this patent

UNITED STATES PATENTS

| | | |
|---|---|---|
| 2,695,396 | Anderson | Nov. 23, 1954 |
| 2,717,372 | Anderson | Sept. 6, 1955 |
| 2,775,650 | Mason et al. | Dec. 25, 1956 |
| 2,845,611 | Williams | July 29, 1958 |
| 2,900,622 | Rajchman et al. | Aug. 18, 1959 |